(12) United States Patent
Kang et al.

(10) Patent No.: US 10,802,972 B2
(45) Date of Patent: Oct. 13, 2020

(54) DISTRIBUTED MEMORY OBJECT APPARATUS AND METHOD ENABLING MEMORY-SPEED DATA ACCESS FOR MEMORY AND STORAGE SEMANTICS

(71) Applicant: MemVerge, Inc, San Jose, CA (US)

(72) Inventors: Wei Kang, Beijing (CN); Yue Zhao, Shanghai (CN); Ning Xu, Shanghai (CN); Yue Li, Fremont, CA (US); Jie Yu, Shanghai (CN); Robert W. Beauchamp, Berlin, MA (US)

( * ) Notice: Subject to any disclaimer, the term of this patent is extended or adjusted under 35 U.S.C. 154(b) by 0 days.

(21) Appl. No.: 16/372,301

(22) Filed: Apr. 1, 2019

(65) Prior Publication Data

US 2020/0042444 A1 Feb. 6, 2020

Related U.S. Application Data

(63) Continuation-in-part of application No. 16/255,414, filed on Jan. 23, 2019.

(60) Provisional application No. 62/713,537, filed on Aug. 2, 2018.

(51) Int. Cl.
*G06F 12/084* (2016.01)
*G06F 12/02* (2006.01)

(52) U.S. Cl.
CPC ........ *G06F 12/084* (2013.01); *G06F 12/0223* (2013.01); *G06F 2212/656* (2013.01)

(58) Field of Classification Search
CPC .............. G06F 12/084; G06F 12/0223; G06F 2212/656; G06F 12/109; G06F 2212/154; G06F 2212/1048; G06F 2212/1024; G06F 2212/152; G06F 3/06; G06F 9/54; G06F 12/08; G06F 16/10; H04L 67/10; H04L 67/1097

See application file for complete search history.

(56) References Cited

U.S. PATENT DOCUMENTS

| 7,162,476 | B1 * | 1/2007 | Belair | G06F 9/54 |
| 10,445,292 | B1 * | 10/2019 | Zhang | G06F 16/1748 |
| 2016/0364158 | A1 * | 12/2016 | Narayanan | G06F 11/1479 |
| 2017/0168953 | A1 * | 6/2017 | Xu | G06F 9/545 |
| 2018/0136842 | A1 * | 5/2018 | Kim | G06F 3/0644 |
| 2020/0045010 | A1 * | 2/2020 | Sun | H04L 61/1552 |

* cited by examiner

*Primary Examiner* — Tasnima Matin

(57) ABSTRACT

Disclosed herein is an apparatus and method for a distributed memory object system. In one embodiment, a method includes forming a system cluster comprising a plurality of nodes, wherein each node includes a memory, a processor and a network interface to send and receive messages and data; creating a plurality of sharable memory spaces having partitioned data, wherein each space is a distributed memory object having a compute node, wherein the sharable memory spaces are at least one of persistent memory or DRAM cache; at a client, establishing an inter process communication between the client and a distributed memory object service; receiving a meta chunk including attributes about a file and a chunk map from a distributed memory object service, wherein the meta chunk includes chunk information including identity and location of a data chunk; and the client mapping the data chunk into virtual memory address space and accessing it directly.

12 Claims, 9 Drawing Sheets

DISTRIBUTED MEMORY OBJECT APPARATUS AND METHOD ENABLING MEMORY-SPEED DATA ACCESS FOR MEMORY AND STORAGE SEMANTICS

CROSS-REFERENCE TO RELATED APPLICATION(S)

This application claims the benefit of and priority to U.S. Provisional Patent Application Ser. No. 62/713,537, filed on Aug. 2, 2018 for "Distributed Memory Object Architecture that Enables Memory-Speed Data Access for both Memory Semantics and Storage Semantics in a Distributed Environment", and 2) U.S. Non-provisional patent application Ser. No. 16/255,414, filed on Jan. 23, 2019 for "A Distributed Memory Object Architecture", the entire disclosure of which are incorporated herein by references.

TECHNICAL FIELD

The present disclosure relates generally to distributed computing environments, and more particularly, to a distributed memory object architecture.

BACKGROUND

The computer industry continues to develop and refine solid-state storage devices and media, moving closer and closer to achieving memory-class storage. In the past decade there has been a thousand-fold reduction in access latency of affordable storage devices, and another twenty-fold reduction is expected within the year. At the same time, networking speeds have seen more than a 100-time increase in bandwidth with commensurate latency decrease, plus the emergence of standardized remote direct memory access (RDMA) functionality that can improve communication efficiency and further reduce latency.

These faster computing infrastructures demand new data infrastructures where both memory-speed data access and disk-like high storage density are strongly desired at the same time. Such new data infrastructures promise to bring significant performance improvements to computing tasks whose working data sets exceed dynamic random access memory (DRAM) capacity, and where highly frequent data movements between DRAM and lower storage tiers, such as solid state drive (SSD) and hard disk drive (HDD), are therefore required.

To provide the lowest possible access latency, operating system support of emerging persistent memory (PMEM) technology has created mechanisms for a user-space application to have direct access (DAX) to persistent memory media (i.e., without the access being performed by operating system software). Examples of existing solutions include:

"NOVA", which is a single-node file system for persistent memory with emphasis on consistency. It uses per-file metadata journals for fast, concurrent, consistent updates. NOVA also supports DAX memory mapped access. It, however, does not provide cross-node replication or availability.

"Strata", which is a single-node file system that provides a tiered, log-structured file system starting from a persistent memory layer and progressing to SSD then HDD as the data access frequency cools. It, however, does not support DAX memory map access, nor provide cross-node replication or availability.

"Octopus", which is a multi-node distributed persistent memory file system using tightly integrated RDMA to reduce communication latency. It, however, does not support DAX memory mapped access.

"Hotpot", which is a multi-node kernel-level distributed shared persistent memory system that provides low latency, transparent memory accesses, data persistence, data reliability, and high availability. It is focused on memory mapped access and does not address standard file storage IO operations.

"FluidMem", which is a multi-node system that realizes disaggregated memory in the datacenter. It does not address memory persistence or storage IO.

None of these existing solutions, however, provide low-latency access of multi-node distributed data objects with both the semantics of memory and the semantics of file storage. It is therefore desirable to provide low-latency memory spaces: 1) that are accessible across a cluster of nodes, 2) that can exceed the memory capacity of a given node in the cluster, and 3) that can span the memory and storage of multiple nodes. It is further desirable that these memory spaces be accessible with either the load/store semantics of memory, or with the read/write, input/output semantics of file storage. Disclosed herein in a distributed memory object (DMO) system, referred to as MemVerge DMO system, that provides these types of low-latency memory spaces.

SUMMARY

Disclosed herein is an apparatus and method for a distributed memory object. In one embodiment, a method includes forming a system cluster comprising a plurality of nodes, wherein each node includes a memory, a processor and a network interface to send and receive messages and data; creating a plurality of sharable memory spaces having partitioned data, wherein each space is a distributed memory object having a compute node, wherein the sharable memory spaces are at least one of persistent memory or DRAM cache; at a client, establishing an inter process communication between the client and a distributed memory object service; receiving a meta chunk including attributes about a file and a chunk map from a distributed memory object service, wherein the meta chunk includes chunk information including identity and location of a data chunk; and the client mapping the data chunk into virtual memory address space and accessing it directly.

In another embodiment, a system cluster comprising a plurality of nodes, wherein each node includes a memory, a processor and a network interface to send and receive messages and data, wherein the network interface operates on remote direct memory access; a plurality of sharable memory spaces having partitioned data, wherein each space is a distributed memory object having a compute node, wherein the sharable memory spaces are at least one of persistent memory or DRAM cache; and a client to establish an inter process communication between the client and a distributed memory object service and to receive a meta chunk including attributes about the file and a chunk map from a distributed memory object service, wherein the meta chunk includes chunk information including identity and location of a data chunk, the client being configured to map the data chunk directly into virtual memory address space and access it directly. Other embodiments are explained within this disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

As used in the following description, remote direct memory access (RDMA) refers to a direct memory access mechanism that enables a computer to access the memory of another computer without involving the operating system of either computer. Persistent memory (PMEM) refers to the storage of data structures such that the data can continue to be accessed using memory instructions, e.g., load and store, even after completion of the process that created or modified the data structures.

A MemVerge direct memory object (DMO) system provides persistent distributed memory objects that can be accessed as either in-memory or file-storage mode, and may be implemented in low-latency RDMA. Thus, the Mem-Verge DMO system enables use of DMOs both as memory and storage. The MemVerge DMO system also allows data in the system to be converted between in-memory and file-storage modes. In general, embodiment MemVerge DMO systems provide close-to-memory-speed data access which in turn can significantly relive data bottlenecks observed at upper layer applications. Furthermore, embodiments may be built in user space, thus obviating the need to install a customized operating system kernel. We now turn to FIG. 1 to discuss an embodiment DMO system in more detail.

Figure 1:
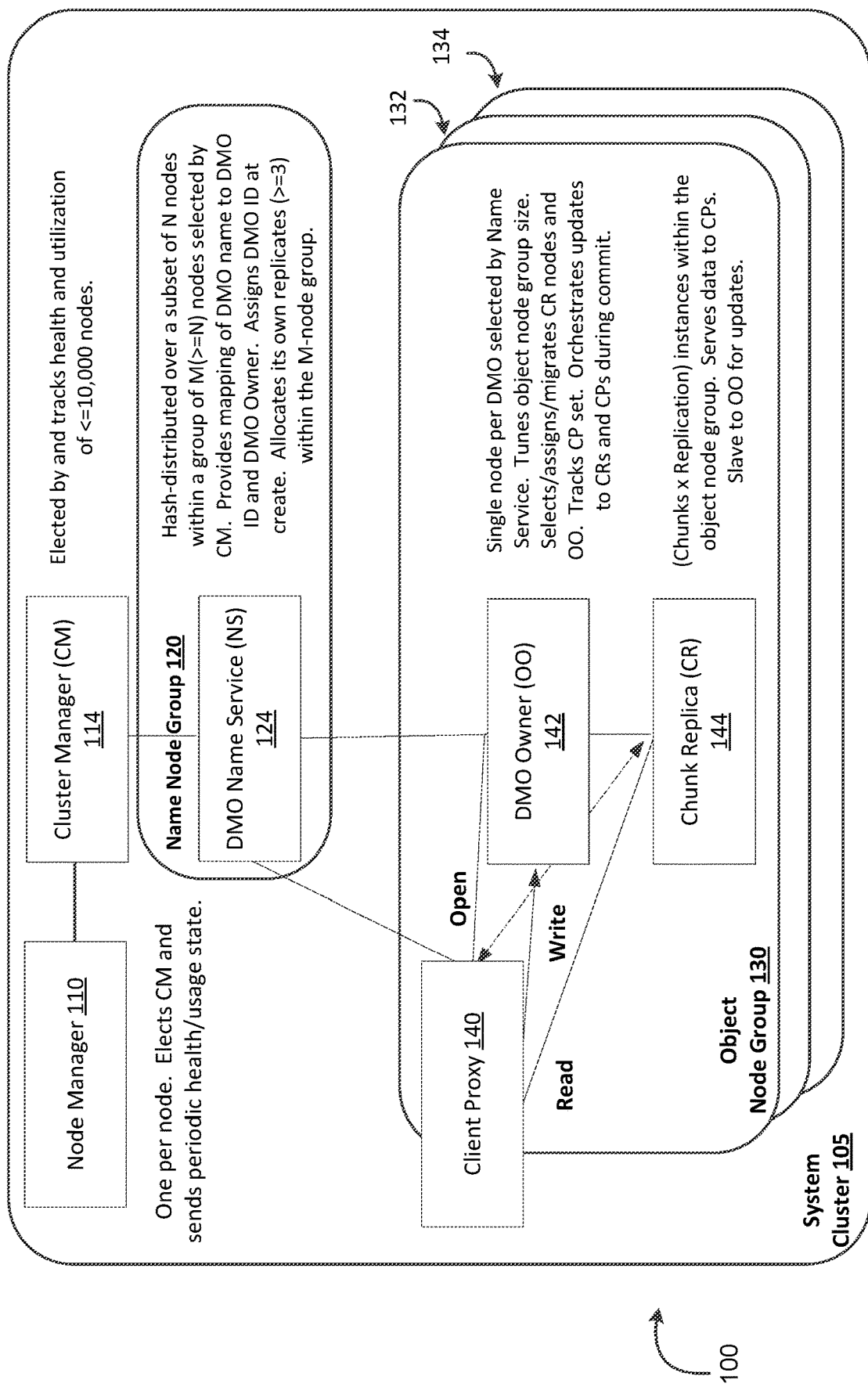
FIG. 1 is an illustration of a system cluster that includes an object node group that implements a distributed memory object (DMO) system, referred to herein a MemVerge DMO system, that provides persistent DMOs that can be accessed as either in-memory mode or file-storage mode.

FIG. 1 is an illustration of one embodiment of a Mem-Verge DMO system 100 that provides persistent distributed memory objects (DMOs) that can be accessed as either in-memory mode or file-storage mode. In DMO system 100, a system cluster 105 is formed by a number of nodes. Each node includes a memory, a processor and a network interface through which it may send and receive messages and data. The illustrated system 100 provides for the creation of sharable memory spaces, each space being a DMO with a single owner node such as object owner (OO) node 142. In this example a node that uses a DMO is referred to herein as a client proxy (CP) node. In the present embodiment, a system cluster 105 within which a MemVerge DMO system 100 may be implemented includes an object node group 130, a name node group 120, a node manager 110, and a cluster manager 114.

Address space for a DMO may be partitioned into equal size chunks, with each chunk being stored on one or more chunk replica (CR) nodes 144 included in the cluster of nodes 105. The chunks are distributed among a subset of the cluster nodes in such a manner as to: 1) focus locality of the chunks for performance efficiency, 2) provide sufficient availability of address space, and to 3) balance resources among the cluster of nodes. Furthermore, any node in a cluster using a DMO can locally keep a copy of a page.

The object owner node 142 is responsible for coordinating updates to the client proxy nodes 140 as well as the chunk replica nodes 144. The object owner node 142 is also responsible for maintaining a configurable replication factor per DMO. The object owner node 142 and chunk replica nodes 144 can migrate to deal with failures, performance, or resource constraints. Client proxy nodes 140 and chunk replica nodes 144 cooperate with the object owner node 142 in implementing protocols to make coherent updates and thereby provide a crash consistent view in the face of failures.

Various functional components of a DMO system are associated with one or more nodes in the system cluster and are described in the follow paragraphs.

Node Manager (NM)

A node manager (NM) 110 operates on each node in a MemVerge DMO system 100. Once a node manager 110 starts on a node, it can start or stop all other services associated with a node. Some services associated with a node may be started or stopped automatically or by request. The node manager 110 is responsible for finding or electing the cluster manager (CM) 114 and notifying its existence and node health to the cluster manager 114. Hence the node manager 110 has access to performance and exception information from other components in the system 100.

Cluster Manager (CM)

The cluster manager 114 runs on a single node in the MemVerge DMO system 100. The single node on which the cluster manager runs is elected by a consensus algorithm of the node managers. The cluster manager mediates cluster membership, node ID assignment, and the name service (NS) group 120. The cluster manager 114 also chooses nodes to satisfy allocation request constraints against cluster resource loading.

DMO Name Service (NS)

The DMO name service (NS) 124 is a hash-distributed service which provides mapping of a DMO name string to its object ID and the object owner. The service is hash distributed across a set of nodes in the system cluster 105. In the present example, the set of nodes is a name service group that is determined by the cluster manager.

Object Owner (OO)

The DMO object owner 142 is a single-node service that manages a DMO. The node corresponding to the client proxy 140 that creates the DMO becomes the object owner node 142. The object owner is responsible for selecting (via a cluster manager 114) an initial object node group 130 to contain the DMO and for assigning the chunk replicas (CRs) 144 within that node group. Some embodiments may contain additional object node groups 132, 134, etc. The object owner 142 also manages growing, shrinking, migrating, and recovering both the node group 130 as a whole, and the chunk replica 144 assignments within that group, as required to meet the DMO's size and replication requirement, or to optimize its usage efficiency. The object owner 142 can choose to move to another node (e.g., to be on the same node as a write client proxy). If the object owner 142 node fails, the DMO's node group will re-elect an object owner. The object owner keeps track of client proxies and orchestrates all updates affecting the DMO, e.g., configuration changes as well as data writes (msync commits and/or write IO).

Chunk Replica (CR)

The chunk replica 144 is a slave entity to the object owner 142 and client proxy 140. The object owner and client proxy read from and write to the chunk replica 144. The chunk replica owns some amount of storage devices (PMEM, SSD, etc.) on its node and manages the details of how/where a chunk of address space is stored therein.

Client Proxy (CP)

The client proxy 140 performs all input/output operations for the client and locally materializes and synchronizes/persists any object that the client requests to be memory mapped. To do that materialization, the client proxy creates a local cache for pieces of remote chunks that are in use and manages selection and eviction of pieces that are unused (or less actively used) as capacity constraints require. The client proxy 140 has code to specifically handle page fault notifications sent to it by the userfaultfd feature of Linux, or similar page fault notifications in other operating environments.

Example Operation Flows

Figure 2:
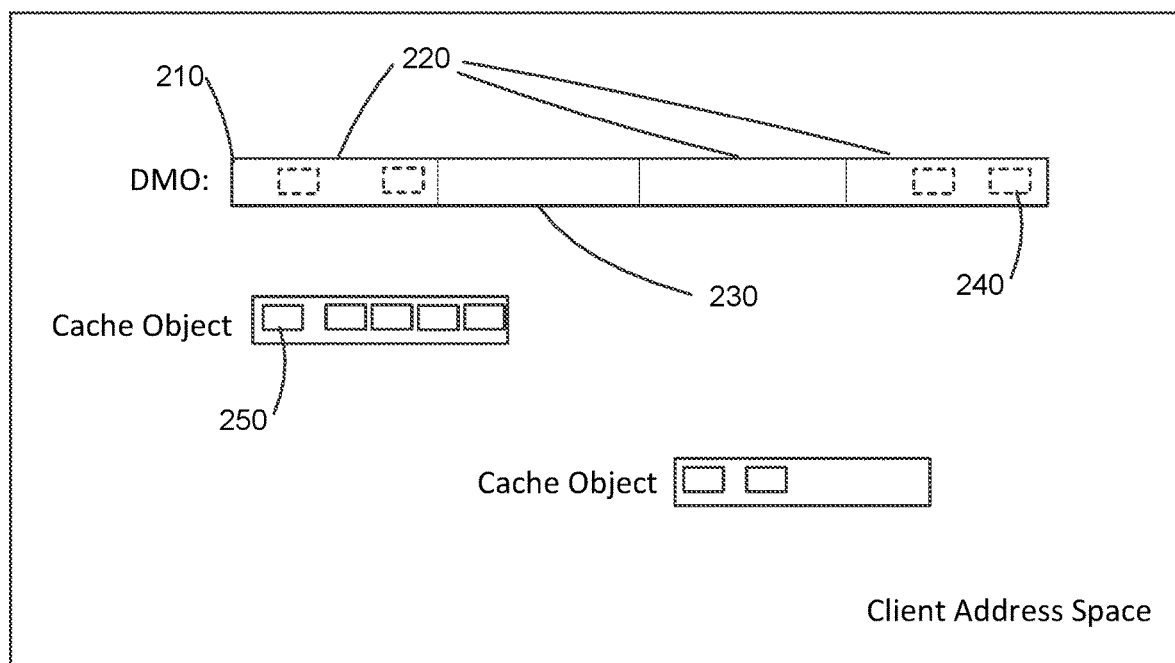
FIG. 2 is an illustration of a DMO in a client address space.

FIG. 2 is an illustration of a DMO in a client address space. When a client proxy opens a DMO, the client proxy allocates a logical address region 210 or space for that DMO and registers the region to monitor for page faults. The client proxy then direct maps for any local chunks 230 at their appropriate offset within the logical address region. Next, the client proxy acquires a remote direct memory access (RDMA) access descriptor to an instance of each remote chunk. The client proxy then creates and maps one or more persistent memory files to use as a cache 250. Now when the application accesses a region of that DMO space that is not direct mapped, a page fault is signaled and the client proxy's page fault handler will allocate an area of the cache file, fill the cache file via an RDMA read of the appropriate remote chunk area 220, and then map that area of the cache file into its appropriate offset of the DMO region, thus completing the handling of the page fault.

Note that management of the cache capacity may require that a previously allocated area of cache be removed from its current role in the DMO address space (i.e., evicted) in order to reassign it for a new role. This eviction process can typically happen as a background task where an eviction candidate is selected, unmapped from the DMO space, and written back via an RDMA write to its remote location if required. The cache area of that candidate is then freed for reallocation.

With continued reference to FIG. 2 and additional reference to FIG. 1, a client application installed in a client node or local node, which may be any node in the system cluster of FIG. 1, opens a DMO name. For example, the client application may "call" MemVerge library that is included in the client application and may "call" a client proxy. The MemVerge library is configured to map an anonymous memory region equal to the size of the DMO, to register that memory region for user page faults, to over map 240 the local chunk files on that memory region, and to remember the cache file for later use. The client proxy is configured to call the DMO name service to get the object owner, call the object owner to get table of chunk nodes, to open "local chunk" files that are on the local node, to open an empty "cache file" or "cache object" on the local node, and to reply to MemVerge library in the local node with file information including: a file descriptor for the local chunk files on the local node and a file descriptor for the cache file/object. The file descriptor for the local chunks may include an offset within the logical address space for the DMO and a size for the local chunk.

The client application starts using the DMO, i.e., it can do load/store references to the DMO, and/or read/write input/output calls to/from the DMO. If a load/store reference from the client application accesses a DMO region that is not over mapped, the client application takes/receives a page fault. The MemVerge library gets a page fault notification and calls to the client proxy. The client proxy caches the needed region into the cache file and replies to the MemVerge library. The MemVerge library then can over map the new region onto an appropriate local DMO space.

Thus, from a client application perspective, a MemVerge DMO system 100 enables a user, via the client application in conjunction with a client proxy, to initiate the use of a DMO, have data placed in one or more memory regions mapped to the DMO by either of a store call or a write call, and access data stored in one or more memory regions mapped to the DMO by a load call or a read call.

One aspect for certain embodiments is to provide a manner for applications to read/write data. Conventionally, applications can only process data in memory and the data is persisted on a hard disk. However, a conventional hard disk device is relatively slow and performance is unacceptable if applications need to access a disk file frequently on inputs and outputs. To bridge this memory/disk performance gap, the traditional storage system implements buffered cache for both read and write.

For a read operation it is likely that data would be needed again shortly after a first read. While keeping the data in memory can be efficient for subsequent reads, it also consumes valuable memory space. Therefore, keeping the data in buffered cache can be a good compromise. For a write operation, the write request returns immediately after the data are copied to the storage system buffered cache. Further, a copy from cache to hard disk can happen asynchronously.

While a buffered cache provides an efficient performance improvement, this solution has its own drawbacks. A buffered cache approach creates an extra memory copy. For example, for a read operation, two copy operations happen with a first one from a disk to the buffered cache, and then from the buffered cache to application memory. Even after optimizing with memory mapped IO, a memory copy is required from the disk to buffered cache. Another drawback of a buffered cache is the memory expense. A buffered cache occupies part of system memory which can originally be used for application computation. Therefore, the cache eviction process can be costly and impact application performance when more memory is required by application. Furthermore, a buffered cache approach also has a drawback with data consistency under a crash. That is, a write operation is reported complete while data can only be persisted on disk after an async copy from cache to disk happens. If a system crashes in between, a user application is not able to know whether or which part of data is on the disk.

Some approaches other than a buffer cache use a direct IO (input/output) mode. In a direct IO mode, read/write data will bypass the buffered cache and go directly to a disk. A direct IO approach solves the issues of a buffered cache, but has its own drawbacks. One drawback of a direct IO approach involves alignment limitation. A direct IO mode requires all IO requests to be aligned with disk sector offset and size. This is a constraining limitation and can negatively impact performance. For example, if an application just wants to read several bytes of a file, it also has to read an entire sector. Additionally, in a direct IO approach there can be performance degradation due to the disk/memory performance gap.

Embodiments herein provide a distributed memory object (DMO) storage system that leverages persistent memory (PMEM) and provides compatible interfaces so that applications can use DMO directly without modification. Generally, a DMO system is a distributed cluster and each cluster member is a hyper-converged node which has PMEM installed and runs both a DMO service and user applications. This allows the applications to read/write on a local PMEM device and also allows accessing remote PMEM through a high-speed network. For IO performance, instead of using buffered cache, DMO uses a memory mapped IO method and logically divides a file into a bunch of chunks, wherein each chunk contains a section of the continuous file data.

The current embodiment is illustrated in PMEM, but a distributed memory object storage system is not so limited and can work on any memory with similar characteristics, for example in after-developed memory hardware. Some of the applicable characteristics of PMEM include performance, being byte addressable and allowing direct mapping. In more detail, PMEM provides near DRAM level access performance. This permits reads/writes of data directly from a device without needing an extra memory copy as cache. As mentioned above, PMEM can be accessed per byte by byte. Therefore, there is no concurrent alignment requirement. Additionally, PMEM can be mapped into user application memory address space and all access is direct without buffered cache. Embodiments are described below in more detail with reference to FIGS. 5-10.

Figure 5:
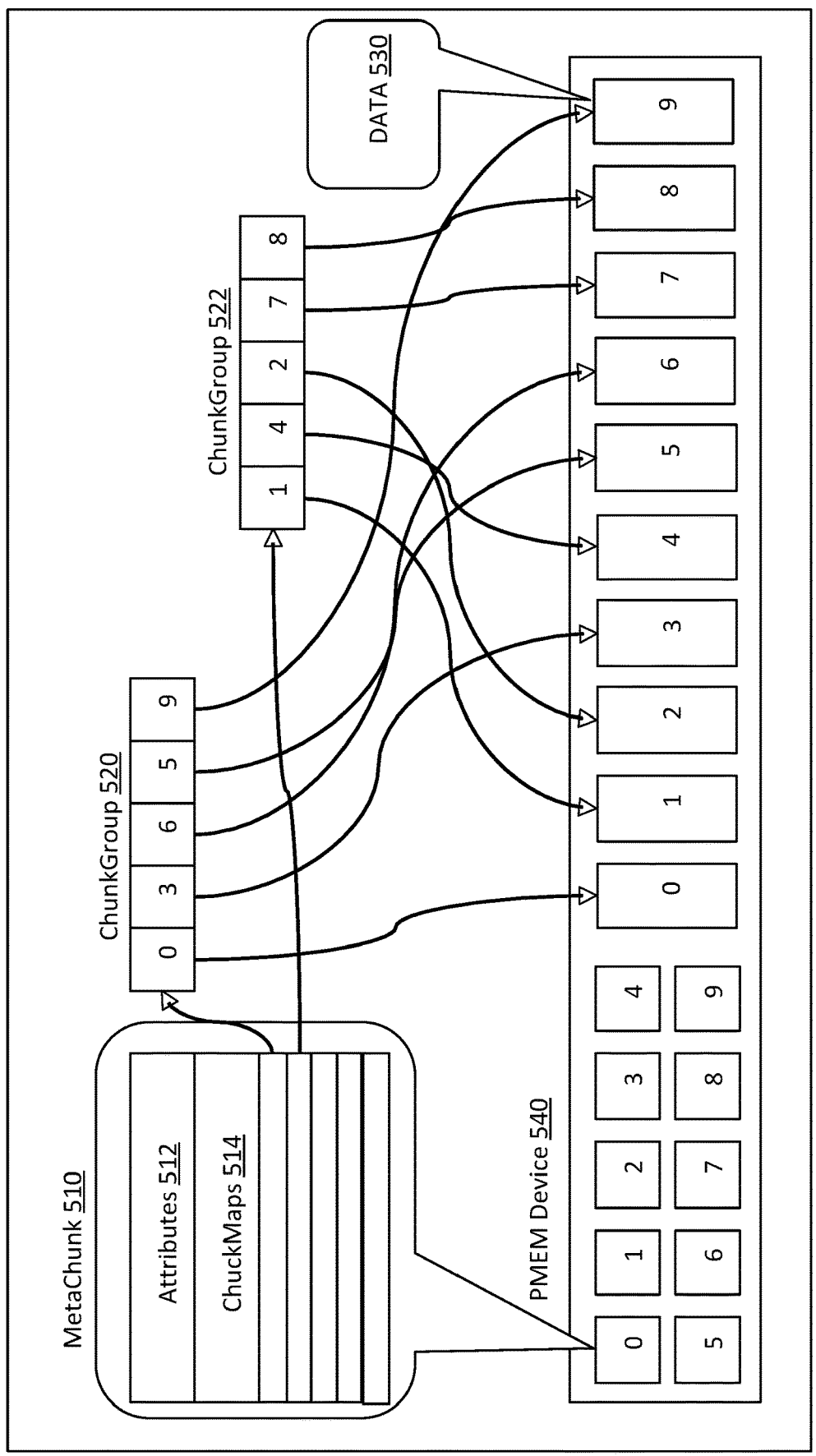
FIG. 5 is an illustration of a chunk based file in a distributed memory object architecture.

FIG. 5 is an illustration of a chunk-based file in a distributed memory object architecture. The embodiment illustrated in FIG. 5 includes a meta chunk 510 which includes attributes 512 and chunk maps 514. The meta chunk 510 is stored on a PMEM device 540 and associates with chunk group 520, chunk group 522 and data 530. As is illustrated in figure, chunk group 520 and chunk group 522 are stored as data within PMEM device 540 and a chunk map 514 in the meta chunk 510 coordinates each chunk group with a location in the PMEM device.

In this way, a DMO architecture utilizes two types of chunks to organize a file, a data chunk 530 and a meta chunk 510. The data chunk 530 is a piece of data in a file. The data chunk may have a fixed or variable size. The meta chunk 510 includes necessary information about the file, including attributes and chunk maps. Attributes includes common attributes needed by a file, such as size, btime, mtime, etc., while chunk maps 514 include chunk information required for a file to locate every data chunk. Chunk information describes the identity and location of a data chunk. A chunk group is a logical conception to help improve object locality and it describes a batch of chunks in a same PMEM device.

Figure 6:
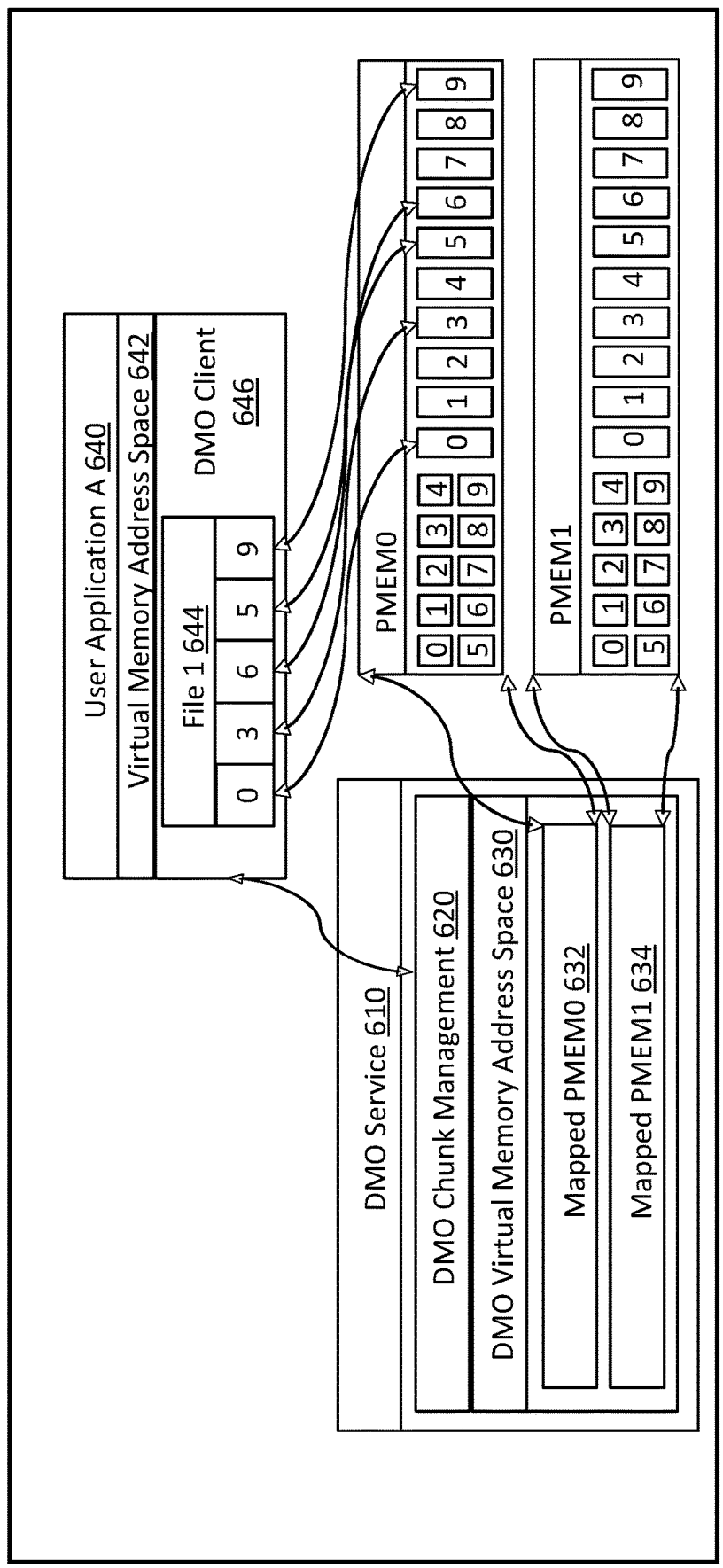
FIG. 6 is an illustration of memory mapped IO in a chunk map based distributed memory object.

FIG. 6 is an illustration of memory mapped IO in a chunk map based distributed memory object. The embodiment in FIG. 6 includes a DMO service 610 containing a DMO chunk management 620, and a DMO virtual memory address space 630 which includes a first mapped PMEM0 632 and a second mapped PMEM1 634. The illustrated embodiment further includes a user application 640 in communication with DMO chunk service 610. The user application may include a virtual memory address space 642 have a first file 644 and a DMO client 646. As illustrated in the figure, the first file may have data stored in PMEM0 632. In this way, the DMO service 610 maps PMEM devices into virtual memory address space and DMO service 610 can access meta chunks and data chunks directly.

User application A 640 is shown, but in practice there may be a plurality of user applications. Referring to the applications, each application might access different files. However, for security reasons, each application should only map needed chunks instead of all devices. As discussed above, user application 640 implement DMO client 646 and integrate it with user applications. DMO client 646 may communicate with DMO service 610 through an inter process communication (IPC) to perform the actual read/write IO operations.

In process, a client may receive a file's chunk map information from DMO service 610 and map the corresponding data chunk directly into its own virtual memory address space. After the chunk is mapped, the user application 640 can access the chunk directly without DMO being involved. Further, by using a memory mapped IO procedure, the user application 640 can direct access file data and avoid any extra memory copy between different memory buffers.

Figure 7:
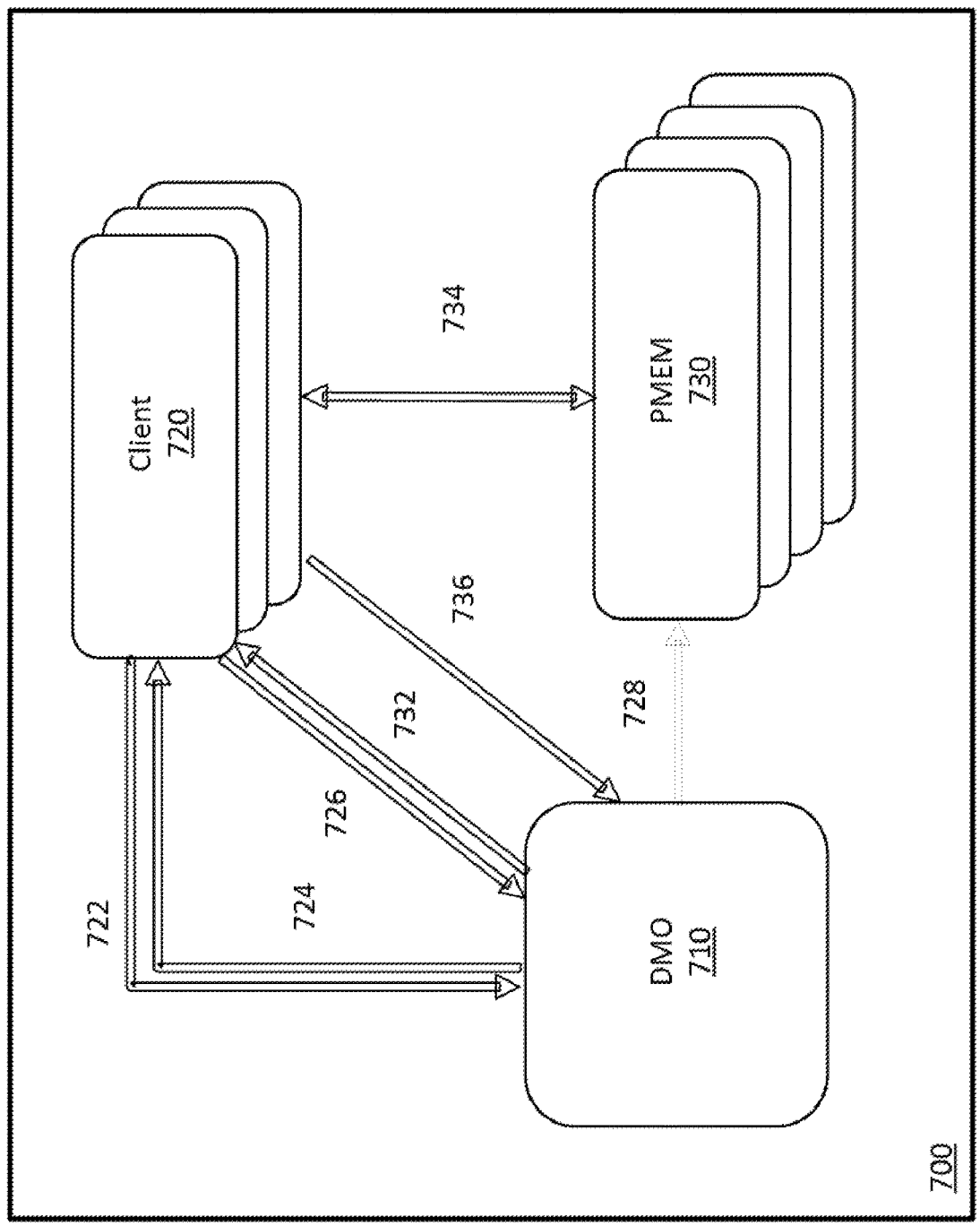
FIG. 7 is an illustration of one embodiment of a client IO process in a distributed memory object architecture.

FIG. 7 is an illustration of one embodiment of a client IO process 700 in a distributed memory object architecture. Initially, an embodiment process establishes IPC connections at 722, wherein an IPC connection is established between a client and a DMO to exchange necessary data. Example embodiments of an IPC connection can utilize a UNIX domain socket, a Share Memory, a network socket or any other system IPC facilities.

At 724, the client IO process 700 gets PMEM devices. After the IPC connection is established in 722, the client receives the PMEM device information so that the client can access chunks using chunk info, etc. In some embodiments, chunk information contains a device ID to indicate which PMEM device this chunk belongs to; an offset to indicate the start offset on the PMEM device of the chunk data; and a length value indicating the length of chunk data.

Then, at 726 the client IO process 700 receives map information. That is, when a client wants to access a file, the client requests that the DMO provides the information needed for chunk maps. At 728, the DMO may prepare chunk information for the client. This operation may cover multiple cases, including: when a chunk does not exist (for example, when a client plans to write a file but there is no chunk for the request write range), the DMO will allocate a chunk for it; when a chunk exists and is in local PMEM device, the DMO provides the chunk information and return to client; when a chunk exists but is in a remote node's PMEM device, the DMO will allocate a temporary cache chunk and grab the needed data from remote PMEM chunk so the client could map the chunk in a local device; and normally an IO request will involve multiple chunks, therefore the DMO may be configured to aggregate all the chunk information.

At 732, after preparing the chunks, the DMO will return all chunk information back to client. Then at 734, after get all chunk info, the client will map all chunks into a continuous virtual memory space by: (1) using anonymous mmap( ) to get a continuous virtual memory space; and (2) using MAP_FIXED mmap( ) to map a piece of PMEM device to the memory space obtained from (1) according to the chunk info. Then client IO process 700 repeats (2) for all the chunks. After all chunks are mapped, the client receives a file's data and can use it directly. Continuing with the illustrated process in FIG. 7 at 736, after the client is done with the data, the client notifies the DMO to update metadata for any potential changes.

Figure 8:
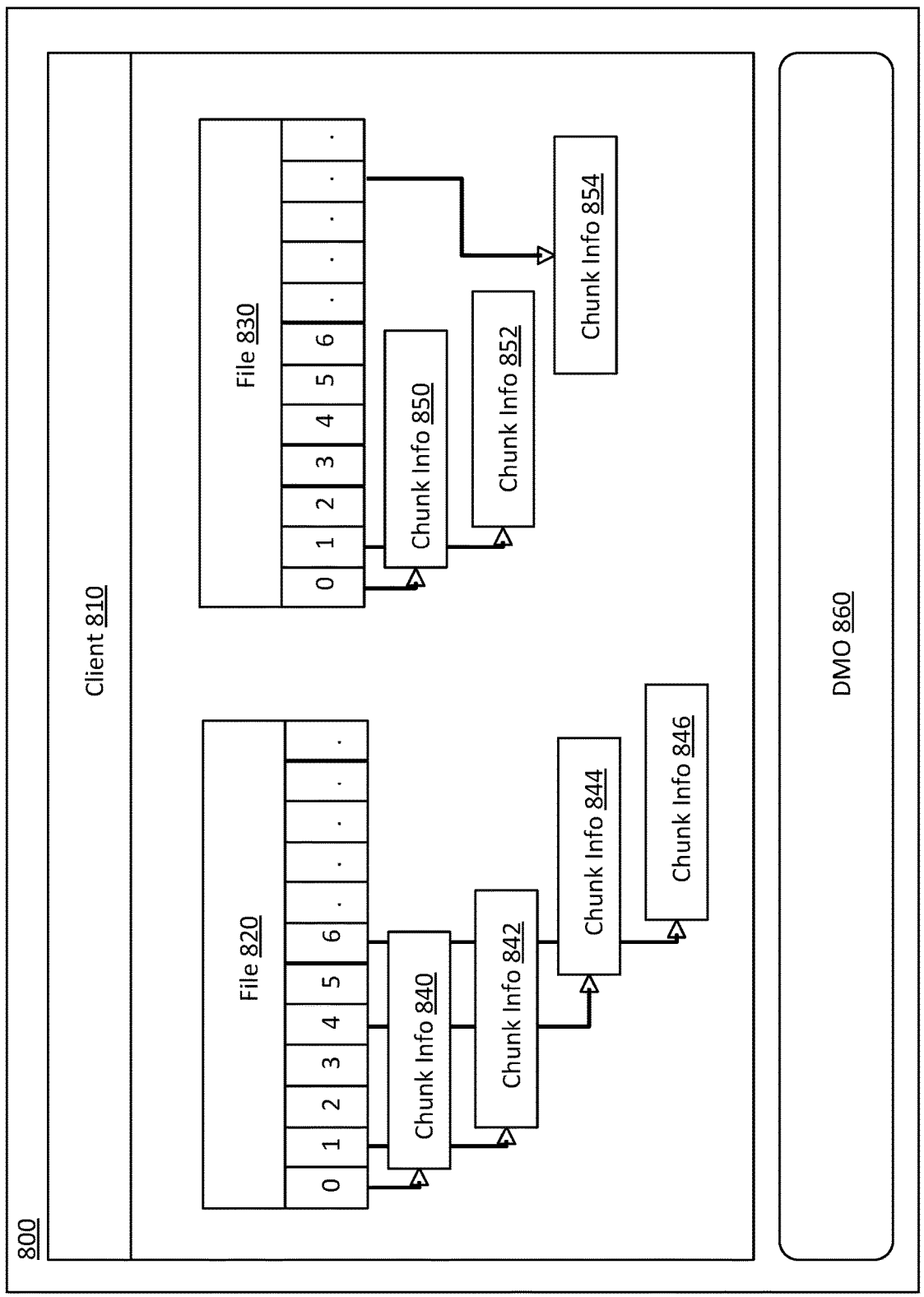
FIG. 8 is an illustration of a client side cache in a distributed memory object architecture.

FIG. 8 is an illustration of a client-side cache 800 in a distributed memory object architecture. As described in relation to FIG. 7 above, a client 810 will receive chunk information 840, 842, 844, 846, 850, 852 and 854 from a DMO service 860 for any IO operations. As an IPC between a DMO client and DMO service 860 take a certain amount of time, in the case where a user application needs a lot of small IO the IPC overhead can be a performance bottleneck. A client-side cache is used to address this type of bottleneck. As one difference from a traditional storage system that caches all data in the memory, a DMO client only caches the chunk information which is a very small data structure. Thus, a DMO client-side cache can be implemented in a memory conserving manner.

In the illustrated embodiment, a chunk information cache is file based. Therefore, in the memory, each file will maintain a cache map for the file chunks. After adding a client-side cache, the IO process changes accordingly in the DMO client side. For example, a user application may require an IO operation. In response, a DMO client will check if the relevant chunk information has already existed in the chunk information cache. If yes, the DMO client can just return the chunk information back for TO. If not, there will be a request for the chunk information to be sent from the DMO via IPC. Then, the user application can receive the chunk information and can performance TO.

This approach can significantly decrease IPC overhead in an IO path. And based on the chunk information cache mechanism, a DMO client may also implement the chunk information prefetch. It also improves the performance since IPC overhead is much bigger than DMO get more chunk information from PMEM device. Finally, the chunk information cache can be released after a file is closed. In the case that there is memory pressure, chunk information also can be individually evicted per a least recently used (LRU) algorithm or similar process.

Figure 9:
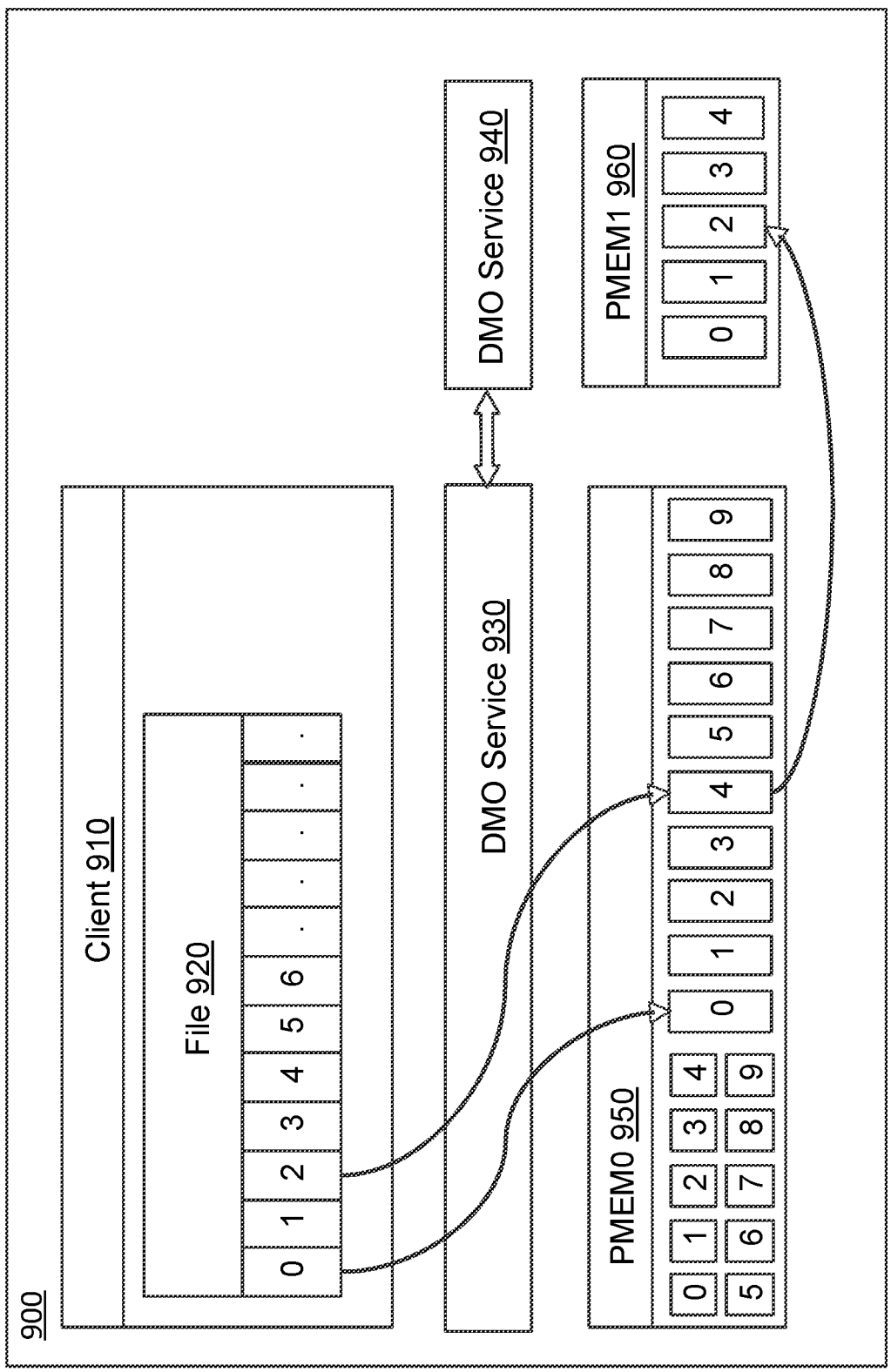
FIG. 9 is an illustration of an embodiment of a mapped remote persistent memory.

FIG. 9 is an illustration of an embodiment of a mapped remote persistent memory architecture 900. The embodiment architecture 900 includes a client 910, having a file 920, a DMO service 930 and 940, and a persistent memory 950 and 960. In this embodiment, a DMO splits a file into many chunks and the chunks can reside on different PMEM devices installed on different nodes.

In some embodiments, to simplify a user application's access, the user application will communicate directly with a local DMO service, and can map the local PMEM device to the user application's virtual memory address. Thus, a DMO service will be configured to handle the case where data is on remote PMEM devices. A DMO approach can therefore implement a cache chunk mechanism to support this case. For example, when a client 910 plans to access chunk 2 in file 920, the client 910 accesses the DMO service 930 to get the chunk information. At this stage, the DMO service 930 determines chunk 2 is on another node's PMEM1 960. The DMO service then allocates a cache chunk from local PMEM0 950 (chunk #4) and copies the contents from PMEM1 via a high-speed network (RDMA/ dpkg/ . . . ) to PMEM0 950. After the data is ready, it returns chunk information of cache chunk #4 back to client 910 and the client can use the chunk information locally.

Next, after a file is closed, all remote chunk data can be flushed back to remote PMEM 960 and the cache chunk can be removed. For future use and to reduce the network data throughput, the DMO may keep the cache chunk in a local PMEM device 950, so if the remote chunk is needed again the DMO doesn't need to re-copy the data. In this case, chunk revalidation may be needed to ensure the cached data is updated. In this way, a DMO service can use a last modified time stamp (mtime) as a key. In the case the chunk is modified, the mtime will be updated. Cached data can therefore be discarded and re-retrieved from the remote chunk. If not, the local cache can be used directly.

The cache chunk will use the local PMEM 950 device space, so when there's not enough space, the DMO will evict some cached chunks to free up more memory space. In similar fashion to the embodiment illustrated in FIG. 8, the DMO can use an LRU or equivalent process to choose which chunk should be evicted.

Implementation Alternatives

Figure 3:
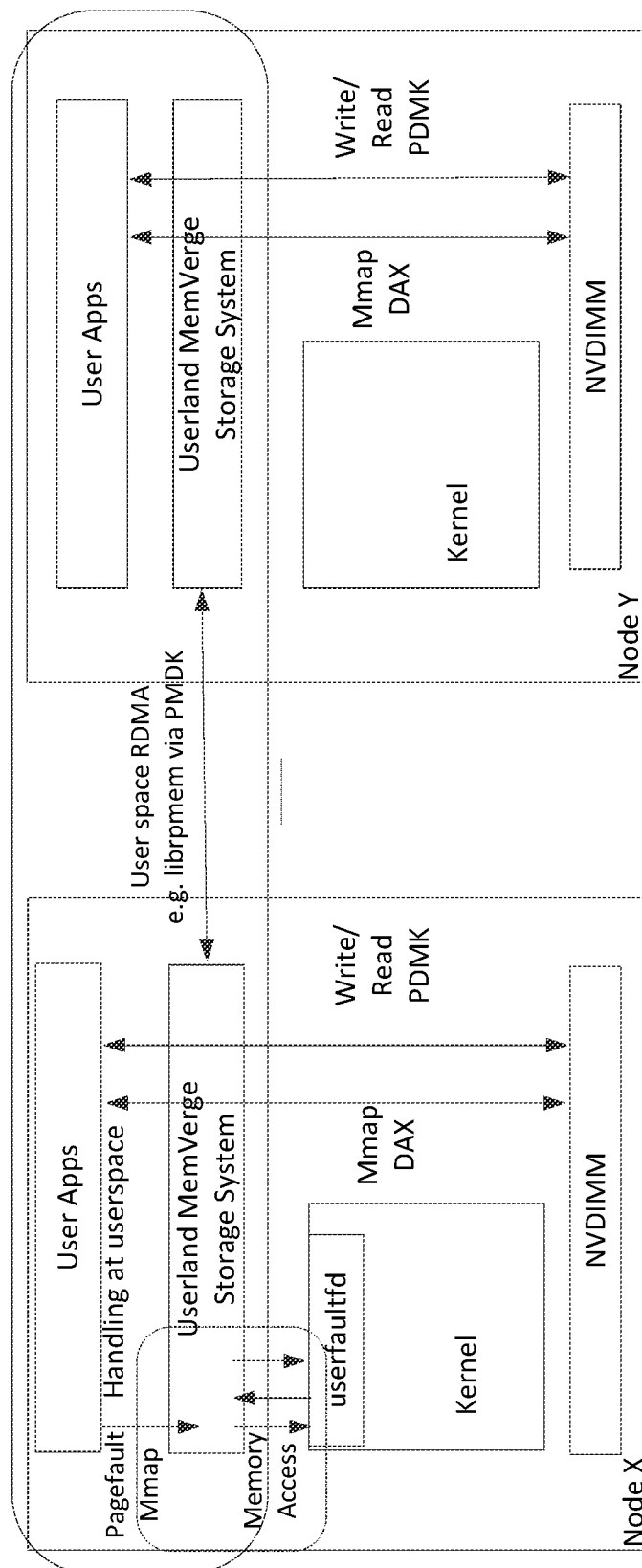
FIG. 3 is an illustration of components and processes of implementing a larger memory space across nodes by a user space approach.

To implement larger memory space than physically available on a node, some form of demand paging is necessary. Three implementation approaches are presented: user space, kernel, and hypervisor. By way of example, FIG. 3 is an illustration of components and processes of implementing a larger memory space across nodes by a user space approach. The user space approach uses the Linux userfaultfd mechanism to monitor the logical address space of the client and provide notification whenever access to a non-resident page of the object is attempted. Since a user space process cannot directly control physical memory mapping, it uses a direct access (DAX) file system to indirectly affect this.

The data for the faulting area is copied to a local file and that file is mapped into the client's address space, thus materializing the data for the page fault. This mechanism is the least intrusive to the operating environment in that it does not require a new operating system. A user space approach may provide fast development, which in turn may be beneficial to both prototype and product developments. Furthermore, a user space approach may facilitate experiments with different new technologies invented for user space apps. Additionally, a user space approach may be easy to deploy, easy to containerize, and may easily connect to other user space storage frameworks such as SPDK. However, it may utilize indirect access to memory map.

In some embodiments, a kernel space approach uses the kernel memory management to intercept page faults from the client process. As a kernel entity, the page fault handler can directly manipulate the address map. The handler can maintain a memory pool where it caches a copy of the required data, and then directly map it into the client's address space. A kernel space approach can provide a fast, efficient access to memory map; however, it also could use a custom OS and may increase scope of testing (re-verify OS).

Figure 4:
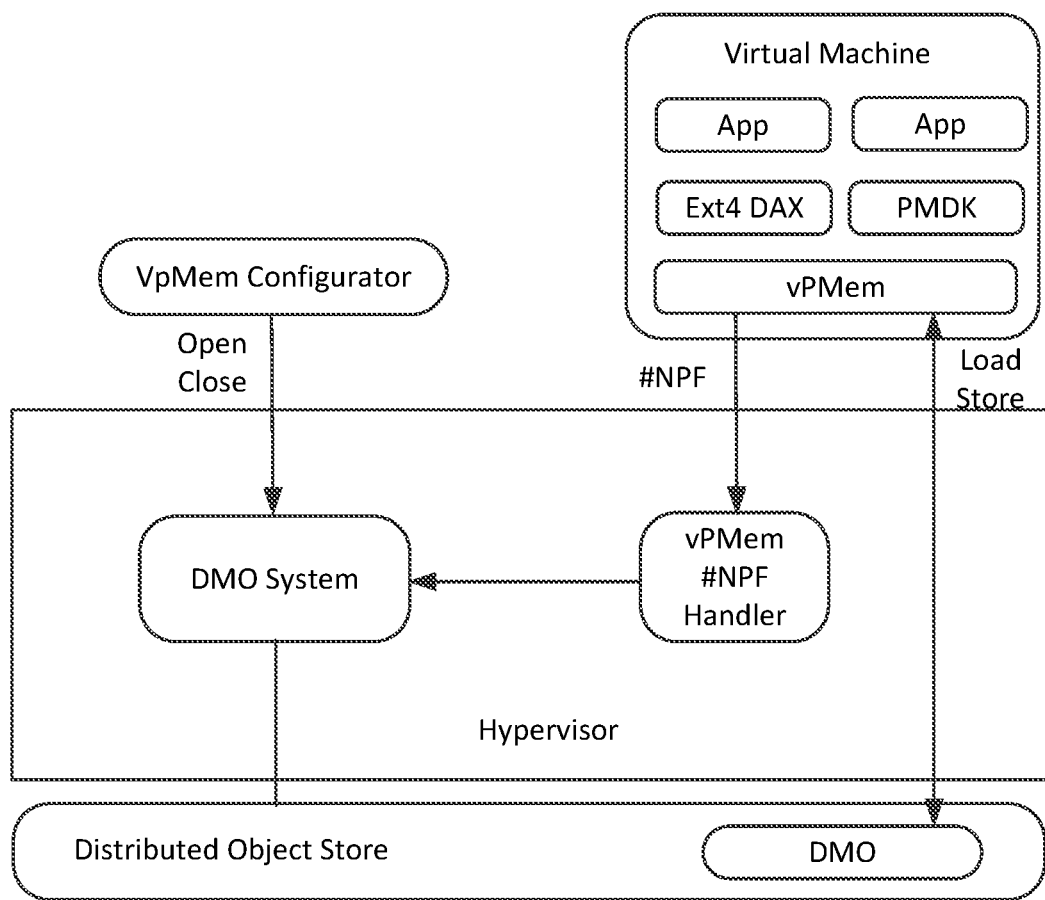
FIG. 4 is an illustration of components and processes of implementing a larger memory space across nodes by a hypervisor approach.

FIG. 4 is an illustration of components and processes of implementing a larger memory space across nodes by a hypervisor approach. In the hypervisor approach, one or more virtual PMEM (vPMem) devices is presented to the host operating system. Each vPMem is a logical address space within the hypervisor address map that gets presented to the host operating system as its physical address space. The hypervisor's memory manager intercepts the page faults to that space to materialize the assigned object's data.

Analogous to the OS kernel, a hypervisor has direct access to its map. The page fault handler can therefore maintain a memory pool in which it caches required data, and then map that data into the host OS's address space to service a page fault. Note that the page fault can be from a user application in the host OS, or from a host OS component, etc. This approach can provide a fast, efficient access to memory map, and does not require a custom operating system.

While various embodiments of the invention have been described above, they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, the various features and functionality described in one or more of the individual embodiments are not limited in their applicability to the particular embodiment with which they are described. They instead can be applied alone or in some combination, to one or more of the other embodiments of the disclosure, whether or not such embodiments are described, and if such features are presented as being a part of a described embodiment. Thus, the breadth and scope of the present disclosure should not be limited by any of the above-described exemplary embodiments.

In this document, the terms "module" and "engine" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

The invention claimed is:

1. A method for a distributed memory object (DMO), the method comprising:
   forming a system cluster comprising a plurality of nodes, wherein each node includes a memory, a processor and a network interface to send and receive messages and data;
   creating a plurality of sharable memory spaces having partitioned data, wherein each space is a distributed memory object having a compute node, wherein the sharable memory spaces are at least one of persistent memory or DRAM cache;

at a client, establishing an inter process communication between the client and a distributed memory object service;

receiving a meta chunk including attributes about a file and a chunk map from a distributed memory object service, wherein the meta chunk includes chunk information including identity and location of a data chunk; and the client mapping the data chunk into virtual memory address space and accessing it directly, wherein the distributed memory object (DMO) is managed by a distributed memory object (DMO) owner, wherein the client mapping the data chunk further comprises:

using anonymous mmap( ) to get a continuous virtual memory space; and using MAP_FIXED mmap( ) to map a piece of a PMEM device to the continuous virtual memory space according to the chunk information.

2. The method of claim 1, further comprising the distributed memory object (DMO) allocating a chunk when the data chunk does not exist.

3. The method of claim 1, further comprising retrieving the chunk information and return it to the client when the chunk exists and is stored in a local persistent memory (PMEM) device.

4. The method of claim 1, further comprising the DMO allocating a temporary cache chunk and retrieving data from remote PMEM chunk when the chunk exists but is in a remote node PMEM device.

5. The method of claim 1, further including caching chunk information in a client side cache, wherein in response to a user application requesting an input/output operation, the distributed memory object client checking if the chunk information already existed in a chunk information cache, and if so returning the chunk information to the client, wherein upon receiving the chunk information the user application can perform input/output operations on the chunk directly in the virtual memory address space.

6. The method of claim 1, further including caching chunk information in a client side cache, wherein in response to a user application requesting an input/output operation, the distributed memory object client checking if the chunk information already existed in a chunk information cache, and if not requesting the chunk information from the distributed memory object using an inter process communication (IPC), wherein upon receiving the chunk information the user application can perform input/output operations on the chunk directly in the virtual memory address space.

7. A distributed memory object, comprising:

a system cluster comprising a plurality of nodes, wherein each node includes a memory, a processor and a network interface to send and receive messages and data, wherein the network interface operates on remote direct memory access;

a plurality of sharable memory spaces having partitioned data, wherein each space is a distributed memory object having a compute node, wherein the sharable memory spaces are at least one of persistent memory or DRAM cache; and a client to establish an inter process communication between the client and a distributed memory object service and to receive a meta chunk including attributes about the file and a chunk map from a distributed memory object service, wherein the meta chunk includes chunk information including identity and location of a data chunk, the client being configured to map the data chunk directly into virtual memory address space and access it directly, wherein the distributed memory object (DMO) is managed by a distributed memory object (DMO) owner, wherein the data chunk is map mapped with an anonymous mmap( ) to get a continuous virtual memory space and a MAP_FIXED mmap( ) to map a piece of a PMEM device to the continuous virtual memory space according to the chunk information.

8. The distributed memory object of claim 7, wherein the distributed memory object (DMO) is configured to allocate a chunk when the data chunk does not exist.

9. The distributed memory object of claim 7, further being configured to retrieve the chunk information and return it to the client when the chunk exists and is stored in a local persistent memory (PMEM) device.

10. The distributed memory object of claim 7, wherein the DMO is configured to allocate a temporary cache chunk and retrieve data from remote PMEM chunk when the chunk exists but is in a remote node PMEM device.

11. The distributed memory object of claim 7, further including a client side cache to cache chunk information, wherein in response to a user application requesting an input/output operation, the distributed memory object client is configured to check if the chunk information already existed in a chunk information cache, and if so, to return the chunk information to the client, wherein upon receiving the chunk information the user application can perform input/output operations on the chunk directly in the virtual memory address space.

12. The distributed memory object of claim 7, further including a client side cache to cache chunk information, wherein in response to a user application requesting an input/output operation, the distributed memory object client is configured to check if the chunk information already existed in a chunk information cache, and if not, to request the chunk information from the distributed memory object using an inter process communication (IPC), wherein upon receiving the chunk information the user application can perform input/output operations on the chunk directly in the virtual memory address space.

* * * * *